US009215697B2

(12) United States Patent
Zhang

(10) Patent No.: US 9,215,697 B2
(45) Date of Patent: Dec. 15, 2015

(54) METHODS AND SYSTEMS FOR CSI-RS RESOURCE ALLOCATION IN LTE-ADVANCE SYSTEMS

(75) Inventor: Wenfeng Zhang, Plano, TX (US)

(73) Assignee: ZTE (USA) INC., Iselin, NJ (US)

( * ) Notice: Subject to any disclaimer, the term of this patent is extended or adjusted under 35 U.S.C. 154(b) by 273 days.

(21) Appl. No.: 13/817,117

(22) PCT Filed: Aug. 16, 2011

(86) PCT No.: PCT/US2011/047962
§ 371 (c)(1),
(2), (4) Date: Apr. 23, 2013

(87) PCT Pub. No.: WO2012/024321
PCT Pub. Date: Feb. 23, 2012

(65) Prior Publication Data
US 2013/0208678 A1 Aug. 15, 2013

Related U.S. Application Data

(60) Provisional application No. 61/374,214, filed on Aug. 16, 2010, provisional application No. 61/389,633, filed on Oct. 4, 2010.

(51) Int. Cl.
H04W 4/12 (2009.01)
H04W 72/04 (2009.01)
H04L 5/00 (2006.01)
(52) U.S. Cl.
CPC ......... *H04W 72/0406* (2013.01); *H04L 5/0053* (2013.01); *H04L 5/0094* (2013.01)

(58) Field of Classification Search
CPC ..... H04L 5/001; H04L 5/0048; H04L 5/0053; H04W 24/02; H04W 72/042
See application file for complete search history.

(56) References Cited

U.S. PATENT DOCUMENTS

2009/0247229 A1 10/2009 Teo et al.
2010/0120397 A1 5/2010 Kazmi et al.
2011/0199986 A1* 8/2011 Fong et al. .................... 370/329

FOREIGN PATENT DOCUMENTS

| CN | 101682881 A | 3/2010 |
| JP | 2012-510772 | 6/2002 |
| RU | 2008116713 A | 11/2009 |
| WO | WO 2007/038729 | 4/2007 |

(Continued)

OTHER PUBLICATIONS

Motorola, "CSI-RS Pattern Design based on CSM," *3rd Generation Partnership Project (3GPP)*, 3GPP TSG RAN1 #61, May 4, 2010, Montreal, Canada, XP050420232, 5 pages.

(Continued)

*Primary Examiner* — Minh-Trang Nguyen
(74) *Attorney, Agent, or Firm* — Duane Morris LLP

(57) ABSTRACT

Systems and methods for the configuration of channel state information reference signals (CSI-RS) are disclosed. The systems and methods include providing user equipment with the locations of CSI-RS reuse information. Several encoding patterns and exemplary methodology for both the identification of the CSI-RS resource element locations are provided in exemplary embodiments. In addition, exemplary embodiments provide muting methods and systems for a physical downlink shared channel resource elements.

17 Claims, 4 Drawing Sheets

(56) References Cited

FOREIGN PATENT DOCUMENTS

| WO | WO-2010-064842 | 6/2010 |
|----|----------------|--------|
| WO | WO-2012-024321 | 2/2012 |

OTHER PUBLICATIONS

NTT Docomo, "Intra-cell CSI-RS Design," 3rd Generation Partnership Project (3GPP), 3GPP TSG RAN WG1 Meeting #61bis, Jul. 5, 2010, Dresden, Germany, XP050449617, 7 pages.

ZTE, "Considerations on CSI-RS configuration signaling," 3rd Generation Partnership Project (3GPP), 3GPP TSG RAN WG1 Meeting #62, Aug. 17, 2010, Madrid, Spain, XP050449851, 8 pages.

ZTE, "CSI-RS Pattern and Configuration," 3rd Generation Partnership Project (3GPP), 3GPP TSG RAN WG1 Meeting #61, May 15, 2010, Montreal, Canada, XP050420449, 6 pages.

Extended European Search Report dated Jul. 14, 2014, from corresponding European Patent Application No. 11818680.8, 15 pages.

Office Action dated Dec. 16, 2013, from corresponding Chinese Patent Application No. 201180002891.9, 6 pages.

PCT/US2011/47962 International Search Report and Written Opinion mailed Mar. 2, 2012.

Japanese Official Action dated Jun. 29, 2015, from corresponding Japanese Patent Application No. 2013-524933, 21 pages.

Qualcomm Incorporated, "Further details on CSI-RS," 3GPP TSG-RAN WG1 #60bis R1-103288, May 6, 2010, Montreal, Canada, 13 pages.

Motorola, "Views on inter-cell aspects of CSI-RS design," 3GPP TSG RAN1#60 R1-101463, Feb. 19, 2010, San Francisco, California, 9 pages.

NTT Docomo, "Intra-cell CSI-RS design," 3GPP TSG RAN WG1 Meeting #61 R1-103253, May 4, 2010, Montreal, Canada, 9 pages.

Decision on Grant issued in Russian Patent Application No. 2011148510, dated Jun. 2, 2015 in 7 pages.

* cited by examiner

METHODS AND SYSTEMS FOR CSI-RS RESOURCE ALLOCATION IN LTE-ADVANCE SYSTEMS

CROSS-REFERENCE TO RELATED APPLICATIONS

This application claims priority to U.S. Provisional Patent Application No. 61/374,214, filed on Aug. 16, 2010, entitled "Methods for Configuring CSI-RS Transmission and Related Muting in LTE-Advance Systems," and U.S. Provisional Patent Application No. 61/389,633, filed on Oct. 4, 2010, entitled "Methods for CSI-RS Transmission in LTE-Advance Systems," both of which are incorporated by reference herein in their entirety.

FIELD OF THE INVENTION

The present invention relates generally to wireless communication, and more particularly to methods and systems for allocating channel state information reference signals (CSI-RS), muting resource elements (REs), and transmitting CSI-RSs in a wireless communication system.

BACKGROUND

In wireless communication systems, downlink reference signals are typically created to provide a reference for channel estimation used in coherent demodulation as well as a reference for a channel quality measurement used in multi-user scheduling. In the LTE Rel-8 specification, one single type of downlink reference format called a cell-specific reference signal (CRS) is defined for both channel estimation and channel quality measurement. The characteristics of Rel-8 CRS include that, regardless of the multiple in multiple out (MIMO) channel rank that the user equipment (UE) actually needs, the base station can always broadcast the CRS to all UE based on the largest number of MIMO layers/ports.

In the 3GPP LTE Rel-8 system, the transmission time is partitioned into units of a frame that is 10 ms long and is further equally divided into 10 subframes, which are labeled as subframe #0 to subframe #9. While the LTE frequency division duplexing (FDD) system has 10 contiguous downlink subframes and 10 contiguous uplink subframes in each frame, the LTE time-division duplexing (TDD) system has multiple downlink-uplink allocations, whose downlink and uplink subframe assignments are given in Table 1, where the letters D, U and S represent the corresponding subframes and respectively refer to the downlink subframe, uplink subframe and special subframe that contains the downlink transmission in the first part of a subframe and the uplink transmission in the last part of subframe.

In one system configuration instance (called normal cyclic prefix, or normal-CP) in LTE, each subframe includes $2N_{symb}^{DL}=14$ equal-duration time symbols with the index from 0 to 13. In another system configuration instance (called extended cyclic prefix, or extended-CP) in LTE, each subframe contains $2N_{symb}^{DL}=12$ equal-duration time symbols with an index from 0 to 11.

The frequency domain resource is partitioned into subcarriers up to the full bandwidth within one time symbol. One physical resource block (PRB) is defined over a rectangular 2-D frequency-time resource area covering 12 contiguous subcarriers over the frequency domain and 1 subframe over the time domain wherein the PRB holds 12*14=168 resource elements (RE) for a normal-CP subframe as shown in FIG. 2, for example. FIG. 3 illustrates 12*12=144 REs for an exemplary extended-CP subframe.

In addition, each subframe can also contain two equal-length slots. Each slot may contain 7 OFDM (orthogonal frequency-division multiplexing) symbols. In normal-CP configuration, the OFDM symbols are indexed per slot, where the symbol index runs from 0 to 6; the OFDM symbols can be also indexed per subframe, where the symbol index runs from 0 to 13.

Each regular subframe is partitioned into two parts: the PDCCH (Physical Downlink Control Channel) region and the PDSCH (Physical Downlink Shared Channel) region. The PDCCH region normally occupies the first several symbols per subframe and carries the handset specific control channels, and the PDSCH region occupies the rest of the subframe and carries the general-purpose traffic. The LTE system requires the following mandatory downlink transmissions:

Primary synchronization signal (PSS) and secondary synchronization signal (SSS): These two signals repeat in every frame and serve for the initial synchronization and cell identification detection after UE powers up. The transmission of PSS occurs at symbol #6 in subframes {0,5} for FDD systems with normal-CP, and at symbol #2 in subframes {1,6} for TDD systems; the transmission of SSS occurs at symbol #5 in subframes {0,5} for FDD with normal-CP, and at symbol #13 in subframes {0,5} for TDD with normal-CP;

Physical broadcast channel (PBCH): PBCH also repeats in every frame, and serves for broadcasting of essential cell information. Its transmission occurs over 4 symbols {7~10} in subframe #0;

System information block (SIB): SIB is the broadcast information that is not transmitted over PBCH. It is carried in a specific PDSCH that is decoded by every handset. There are multiple types of SIB in LTE, most of which have a configurably longer transmission cycle, except SIB type-1 (SIB1). SIB1 is fix-scheduled at sub-

TABLE 1

| | | \multicolumn{10}{c}{TDD allocation configurations} |
|---|---|---|---|---|---|---|---|---|---|---|---|
| Uplink-downlink | Downlink-to-Uplink | | | | | Subframe number | | | | | |
| configuration | Switch-point periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | frame #5 in every even frame. SIB is transmitted in PDSCH identified by a system information radio network temporary identifier (SI-RNTI) given in the corresponding PDCCH;

Paging channel (PCH): The paging channel is used to address the handset in idle mode or to inform the handset of a system-wide event, such as the modification of content in SIB. In LTE Rel-8, PCH can be sent in any subframe from a configuration-selective set from {9}, {4,9} and {0, 4, 5, 9} for FDD and {0}, {0,5}, {0, 1, 5, 6} for TDD. PCH is transmitted in PDSCH identified by the paging RNTI (P-RNTI) given in the corresponding PDCCH; and Cell-specific reference signal (CRS): CRS serves for downlink signal strength measurement, and for coherent demodulation of PDSCH in the same resource block. CRS is also used for the verification of cell identification done on PSS and SSS. CRS transmissions have the same pattern in each regular subframe, and occur on symbols {0, 1, 4, 7, 8, 11} with a maximum of four transmission antenna ports in a normal-CP subframe and symbols {0, 1, 3, 6, 7, 9} in an extended-CP subframe. Each CRS symbol carries two CRS subcarriers per port per resource block dimension in frequency domain, as shown in FIGS. 2 and 3. The actual subcarrier index of CRS is shifted by $v_{shift}=N_{ID}^{cell}$ mod 6, where $N_{ID}^{cell}$ is the cell identification. LTE Rel-8 also defines a type of UE specific reference signal (URS) on the antenna port 5. There are 12 URS REs per PRB, occupying 4 symbols in a normal-CP subframe as shown in FIG. 2, and 3 symbols in an extended-CP subframe as shown in FIG. 3. The actual subcarrier index of URS is shifted by $v_{shift}=N_{ID}^{cell}$ mod 3. Although CRS is allocated across the full bandwidth, URS is assigned on a per PRB basis. FIGS. 2 and 3 show examples of CRS and URS with $v_{shift}=0$.

As 3GPP LTE evolves from Rel-8 to Rel-10 (also called LTE-advance or LTE-A), due to the large number of supported antenna ports (up to 8), it can cost a large amount of overhead to maintain the CRS-like reference signal on all ports. Downlink reference signal roles can be separated into the following different RSs:

Demodulation Reference Signal (DMRS): this type of RS is used for coherent channel estimation and should have sufficient density and should be sent on a per UE basis; and Channel State Information Reference Signal: this type of RS is used for coherent channel estimation and should have sufficient density and should be sent on a per UE basis.

According to the 3GPP standard body:

P DMRS can be assigned on a PRB basis, and a DMRS pattern in each PRB can be located at 24 fixed REs in a normal-CP subframe as shown in FIG. 2 or 16 fixed REs in an extended-CP subframe as shown in FIG. 3.

CSI-RS is allocated across the whole system bandwidth. $N_{ANT} \in \{2, 4, 8\}$ is a number of CSI-RS antenna ports per cell. Note that the number of CSI-RS antenna ports is also referred to as $N_{CSIRS}$ in this application. Both $N_{ANT}$ and $N_{CSIRS}$ are inter-changeable in the following description of this application. Then in each PRB, there are $N_{ANT}$ CSI-RS REs labeled as $\{0, 1, \ldots N_{ANT}-1\}$, of which every two CSI-RS REs indexed by 2j and 2j+1 are code-multiplexed.

CSI-RS allocation with $N_{ANT}=8$ (8-Tx) in a normal-CP subframe is shown in FIG. 2, where FIG. 2(a) shows the CSI-RS reuse patterns that cannot coexist with port-5 URS, and FIG. 2(b) shows the CSI-RS reuse patterns that can coexist with port-5 URS. The CSI-RS reuse patterns in FIG. 2(a) can be applied in both frame structure 1 (FS-1 i.e. FDD) and frame structure 2 (FS-2 i.e. TDD), while the C CSI-RS reuse patterns in FIG. 2(b) can be applied in FS-2 (TDD) only.

The CSI-RS allocation with $N_{ANT}=8$ (8-Tx) in extended-CP subframe is shown in FIG. 3, where FIG. 3(a) shows the CSI-RS reuse patterns that cannot coexist with port-5 URS, and FIG. 3(b) shows the CSI-RS reuse patterns that can coexist with port-5 URS. The CSI-RS reuse patterns in FIG. 3(a) can be applied in both frame structure 1 (FS-1 i.e. FDD) and in frame structure 2 (FS-2 i.e. TDD). The CSI-RS reuse patterns in FIG. 3(b) can be applied in FS-2 (TDD) only.

For $N_{ANT}=\{2, 4\}$ (2-Tx and 4-Tx), the CSI-RS RE locations are nested inside the 8-Tx CSI-RS RE locations. When $N_{ANT}=2$, the 2-Tx CSI-RS reuse pattern identified by RE#<0, 1> can be mapped to any REs labeled with <2j, 2j+1> in any 8-Tx reuse pattern. When $N_{ANT}=4$, the 4-Tx CSI-RS reuse pattern identified by RE#<0, 1, 2, 3> can be mapped to any REs labeled with <4j, 4j+1, 4j+2, 4j+3> in any 8-Tx reuse pattern.

CSI-RS is transmitted not only for the intra-cell measurement to support MIMO transmission with up to eight antenna ports in the serving cell, but also for inter-cell measurement in the coordinate-multiple-point (CoMP) transmission, in which the user equipment (UE) or mobile station needs to measure the CSI-RS transmitted from the base stations in surrounding cells and then to report those measurements to the serving cell. All the cells whose CSI-RSs need to be measured by a UE construct the measurement set for that UE.

However, it is not always possible for the UE to measure the signals originated from the non-serving cells because there could be interference between those signals and strong signals transmitted in the serving cell if the cells work on the same frequency. In order to maintain the measurement quality on inter-cell CSI-RS, it is proposed in 3GPP LTE that the PDSCH REs that occupy the same RE locations used by surrounding cells to transmit CSI-RS be muted (transmitted with zero power).

Further, partial muting was also proposed to mute only some of PDSCH REs that collide with CSI-RS REs in surrounding cells wherein the transmission is not muted the on the rest of the REs that collide with CSI-RS REs in surrounding cells. This was to provide better trade-offs between CoMP performance and muting overhead and to provide a flexible adjustment mechanism based on the actual volume of CoMP traffic in the system.

However, the prior art does not provide for the configuration and transmission of CSI-RS signals (i.e., how to inform the UE of the CSI-RS RE locations in the measurement set). In addition, there is a further need to configure the CSI-RS related muting.

SUMMARY OF THE INVENTION

The presently disclosed embodiments are directed to solving issues relating to one or more of the problems presented in the prior art, as well as providing additional features that will become readily apparent by reference to exemplary embodiments in the following detailed description when taken in conjunction with the accompanying drawings.

An embodiment of the present invention is directed to systems and methods for transmitting CSI-RSs and REs to containing CSI-RS reuse information to UE. The method comprises identifying a location of subframes and REs within a subframe within a PRB where a CSI-RS reuse pattern is transmitted. The method further comprises providing the identified locations to one or more UEs. In a further embodiment, the CSI-RS may be specified by a frame index $n_f$ and an index $n_s$ to satisfy $(10 \times n_f + \lfloor n_s/2 \rfloor - \Delta_{CSIRS}) \bmod T_{CSIRS} = 0$ based upon a predefined table.

In a further embodiment, the REs that comprise the CSI-RS reuse patterns within the PRB are specified by the number of CSI-RS ports ($N_{ANT}$) and the location of RE #0 ($<k_{r,0}, l_{r,0}>$) in the reuse pattern wherein the locations of REs and CSI-RS ports ($N_{ANT}$) may either be separately or jointly encoded for $N_{ANT} \in \{2, 4, 8\}$ in an extended cyclic prefix, a normal cyclic prefix, and a normal and extended cyclic prefix FS-1 and FS-2. The encoding pattern may be provided by one or more predefined tables.

In a further embodiment, $\langle k', l', n_s \rangle$ may specify the locations of CSI-RS REs in the CSI-RS reuse pattern with $N_{CSIRS}$ ports wherein k' represents a subcarrier index for $0 \leq k' < 12$ and l' represents an orthogonal frequency-division multiplex (OFDM) symbol index for $0 \leq l' < N_{symb}^{DL}$ where $N_{symb}^{DL}$ is 7 for a normal cyclic prefix subframe or 6 for an extended cyclic prefix subframe. Further, $n_s$ may represent a slot index per frame for $0 \leq n_s < 20$. Note that, for the given CSI-RS reuse pattern, the location of its RE#0 can be defined by either format of $<k_{r,0}, l_{r,0}>$ or $\langle k', l', n_s \rangle$, which are both equivalent to each other according to $k_{r,0} = k'$ and $l_{r,0} = (n_s \bmod 2) \times N_{symb}^{DL} + l'$. Additionally, a reference signal sequence r(m) may be mapped to complex-valued modulation symbols $a_{k,l}^{(p)}$ used as reference symbols for a resource grid according to $a_{k,l}^{(p)} = w_{l''} \cdot r_{l,n_s}(m')$. The embodiments directed towards CSI-RS REs specified by $\langle k', l', n_s \rangle$ may either be separately or jointly encoded for $N_{ANT} \in \{2, 4, 8\}$ in an extended cyclic prefix, a normal cyclic prefix, and a normal and extended cyclic prefix FS-1 and FS-2. The encoding pattern may be provided by one or more predefined tables.

According to an embodiment of the invention, UE may be informed of one or more sets of RE locations and attributes within a PRB wherein each set of RE locations is a subset of CSI-RS REs. The PDSCH associated with a CSI-RS transmission may then be muted. In one embodiment, two PDSCH REs may be muted if they both occupy the same two RE locations as a pair of code division multiplex (CDM) CSI-RS REs indexed with $<2j, 2j+1>$ within the informed sets of RE locations. In a further embodiment, two REs are not muted if one of the two REs occupy the same two RE locations as a pair of CDM CSI-RS REs indexed with $<2j, 2j+1>$ within the informed sets of RE locations that carry a non-PDSCH signal.

In a further embodiment, attributes associated with muted REs may comprise instances of a subframe where the set of REs are muted and a partial muting parameter is used for cell-domain, time-domain, frequency-domain, and spatial-domain partial muting. According to an embodiment, the subframe instances for the given set of muted REs is specified by a frame index $n_f$ and a slot index $n_s$ that satisfy $(10 \times n_f + \lfloor n_s/2 \rfloor - \Delta_{muting}) \bmod T_{muting} = 0$, where $T_{muting}$ and $\Delta_{muting}$ are signaled to the UE by a high-layer RRC parameter $I_{muting}$ based on predefined table.

According to a further embodiment, each set of muted REs may be directly signaled to one or more UEs as a CSI-RS reuse pattern assigned to each interfered cell with the same signaling format that indicates each cell in a CSI-RS measurement set. In an embodiment, each set of muted REs may be signaled by a bitmap and each bit in the bitmap can indicate whether the corresponding REs mapped to CDM-pairs of the CSI-RS in the PRB are muted. Predefined tables may be used to provide encoding and location information corresponding to CSI-RS REs and muted REs.

In a further embodiment, subframe instances that transmit the CSI-RS for muting comprise $N_{CSIRS} \in \{2, 4, 8\}$, wherein $N_{CSIRS}$ is the number of CSI-RS ports; and $\langle k', l', n_s \rangle$ to specify the location of CSI-RS RE#0 in the assigned CSI-RS pattern with $N_{CSIRS}$ ports, wherein k' represents a subcarrier index where $0 \leq k' < 12$, l' represents an OFDM symbol index in a slot where $0 \leq l' < N_{symb}^{DL}$, wherein $N_{symb}^{DL}$ is 7 for a normal cyclic prefix subframe or 6 for an extended cyclic prefix subframe. Additionally, wherein $n_s$ represents a slot index per frame according to $0 \leq n_s < 20$. According to additional embodiments, a reference signal sequence r(m) may be mapped to complex-valued modulation symbols $a_{k,l}^{(p)}$ used as reference symbols for a resource grid according to $a_{k,l}^{(p)} = w_{l''} \cdot r_{l,n_s}(m')$.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Figure 1:
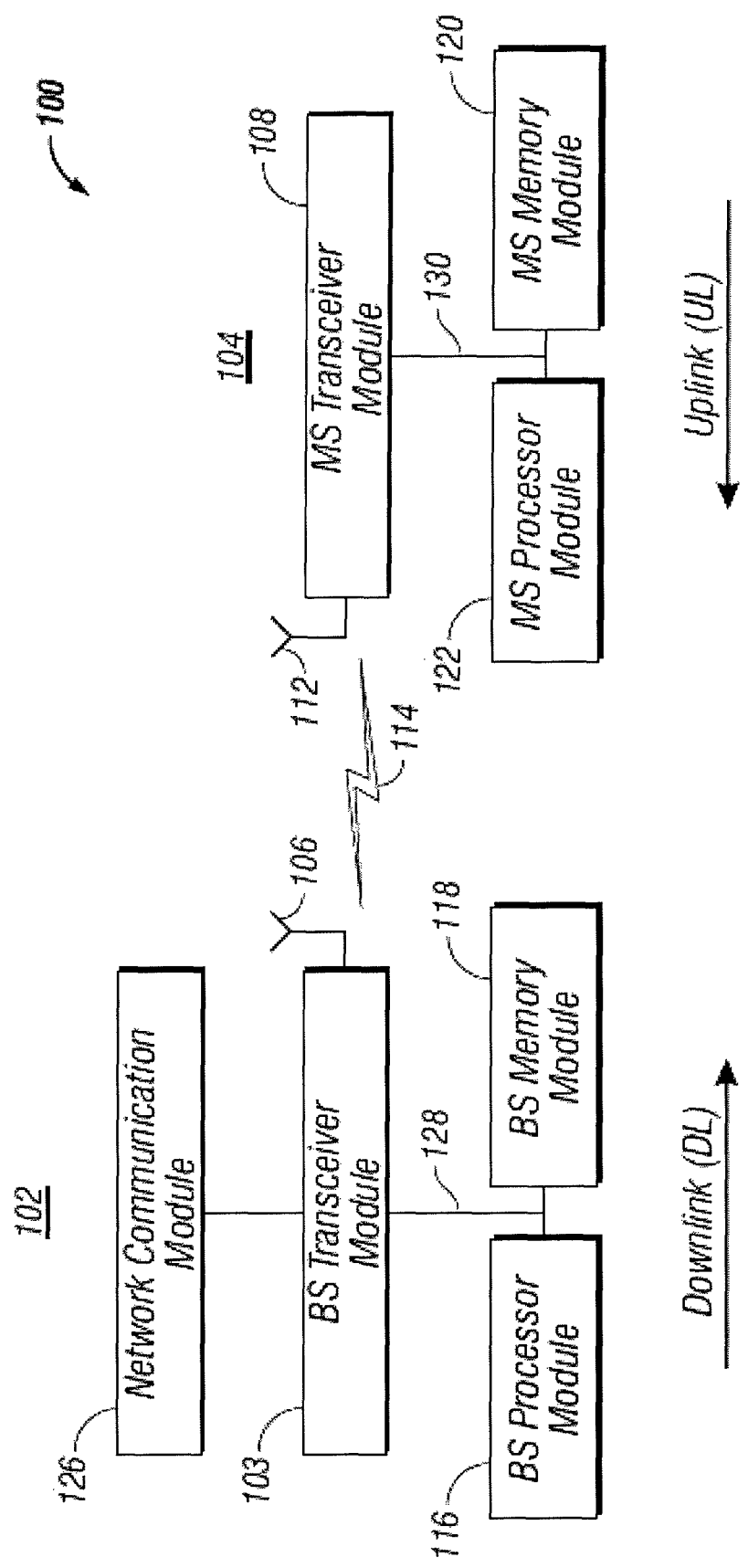
FIG. 1 illustrates an exemplary wireless communication system for transmitting and receiving transmissions, according to one embodiment of the present invention.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings and tables, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

FIG. 1 illustrates an exemplary wireless communication system 100 for transmitting and receiving signals, in accordance with one embodiment of the present invention. The system 100 may include components and elements configured to support known or conventional operating features that need not be described in detail herein. System 100 generally comprises a base station 102 with a base station transceiver module 103, a base station antenna 106, a base station processor module 116 and a base station memory module 118. System 100 generally comprises a mobile station 104 with a mobile station transceiver module 108, a mobile station antenna 112, a mobile station memory module 120, a mobile station processor module 122, and a network communication module 126. Both base station 102 and mobile station 104 may include additional or alternative modules without departing from the scope of the present invention. Further, only one base station 102 and one mobile station 104 is shown in the exemplary system 100; however, any number of base stations 102 and mobile stations 104 could be included and be within the scope of the invention.

These and other elements of system 100 may be interconnected together using a data communication bus (e.g., 128, 130), or any suitable interconnection arrangement. Such interconnection facilitates communication between the various elements of the wireless system 100. Those skilled in the art understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In the exemplary system 100, the base station transceiver 103 and the mobile station transceiver 108 each comprise a transmitter module and a receiver module (not shown). Additionally, although not shown in this figure, those skilled in the art will recognize that a transmitter may transmit to more than one receiver, and that multiple transmitters may transmit to the same receiver. In a TDD system, transmit and receive timing gaps exist as guard bands to protect against transitions from transmit to receive and vice versa.

In the particular exemplary system depicted in FIG. 1, an "uplink" transceiver 108 includes a transmitter that shares an antenna with an uplink receiver. A duplex switch may alternatively couple the uplink transmitter or receiver to the uplink antenna in time duplex fashion. Similarly, a "downlink" transceiver 103 includes a receiver which shares a downlink antenna with a downlink transmitter. A downlink duplex switch may alternatively couple the downlink transmitter or receiver to the downlink antenna in time duplex fashion.

The mobile station transceiver 108 and the base station transceiver 103 are configured to communicate via a wireless data communication link 114. The mobile station transceiver 108 and the base station transceiver 102 cooperate with a suitably configured RF antenna arrangement 106/112 that can support a particular wireless communication protocol and modulation scheme. In the exemplary embodiment, the mobile station transceiver 108 and the base station transceiver 102 are configured to support industry standards such as the Third Generation Partnership Project Long Term Evolution (3GPP LTE), Third Generation Partnership Project 2 Ultra Mobile Broadband (3 Gpp2 UMB), Time Division-Synchronous Code Division Multiple Access (TD-SCDMA), Wireless Interoperability for Microwave Access (WiMAX), and other communication standards known in the art. The mobile station transceiver 108 and the base station transceiver 102 may be configured to support alternate, or additional, wireless data communication protocols, including future variations of IEEE 802.16, such as 802.16e, 802.16m, and so on.

According to certain embodiments, the base station 102 controls the radio resource allocations and assignments, and the mobile station 104 is configured to decode and interpret the allocation protocol. For example, such embodiments may be employed in systems where multiple mobile stations 104 share the same radio channel which is controlled by one base station 102. However, in alternative embodiments, the mobile station 104 controls allocation of radio resources for a particular link and is configured to implement the role of radio resource controller or allocator, as described herein.

Processor modules 116/122 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. Processor modules 116/122 comprise processing logic that is configured to carry out the functions, techniques, and processing tasks associated with the operation of system 100. In particular, the processing logic is configured to support the frame structure parameters described herein. In practical embodiments the processing logic may be resident in the base station and/or may be part of a network architecture that communicates with the base station transceiver 103.

The steps of a method or algorithm described in connection with the embodiments disclosed herein may be embodied directly in hardware, in firmware, in a software module executed by processor modules 116/122, or in any practical combination thereof. A software module may reside in memory modules 118/120, which may be realized as RAM memory, flash memory, ROM memory, EPROM memory, EEPROM memory, registers, a hard disk, a removable disk, a CD-ROM, or any other form of storage medium known in the art. In this regard, memory modules 118/120 may be coupled to the processor modules 118/122 respectively such that the processors modules 116/120 can read information from, and write information to, memory modules 118/120. As an example, processor module 116, and memory modules 118, processor module 122, and memory module 120 may reside in their respective ASICs. The memory modules 118/120 may also be integrated into the processor modules 116/120. In an embodiment, the memory module 118/220 may include a cache memory for storing temporary variables or other intermediate information during execution of instructions to be executed by processor modules 116/222. Memory modules 118/120 may also include non-volatile memory for storing instructions to be executed by the processor modules 116/120.

Memory modules 118/120 may include a frame structure database (not shown) in accordance with an exemplary embodiment of the invention. Frame structure parameter databases may be configured to store, maintain, and provide data as needed to support the functionality of system 100 in the manner described below. Moreover, a frame structure database may be a local database coupled to the processors 116/122, or may be a remote database, for example, a central network database, and the like. A frame structure database may be configured to maintain, without limitation, frame structure parameters as explained below. In this manner, a frame structure database may include a table for purposes of storing frame structure parameters.

The network communication module 126 generally represents the hardware, software, firmware, processing logic, and/or other components of system 100 that enable bi-directional communication between base station transceiver 103, and network components to which the base station transceiver 103 is connected. For example, network communication module 126 may be configured to support internet or WiMAX traffic. In a typical deployment, without limitation, network communication module 126 provides an 802.3 Ethernet interface such that base station transceiver 103 can communicate with a conventional Ethernet based computer network. In this manner, the network communication module 126 may include a physical interface for connection to the computer network (e.g., Mobile Switching Center (MSC)).

Note that the functions described in the present disclosure may be performed by either a base station 102 or a mobile station 104. A mobile station 104 may be any user device such as a mobile phone, and a mobile station may also be referred to as UE.

Embodiments disclosed herein have specific application but not limited to the Long Term Evolution (LTE) system that is one of the candidates for the 4-th generation wireless system. Embodiments described herein provide various exemplary CSI-RS per-cell patterns. Each of these CSI-RS per-cell patterns illustrates a layout of CSI-RS REs that can belong to a single cell, according to various exemplary embodiments of the invention.

According to an exemplary embodiment, the CSI-RS location is configured to inform the UE of two exemplary pieces of information: which downlink subframes and which REs in those subframes carry the assigned CSI-RS reuse pattern. The following exemplary configuration mechanism can be used to configure the CSI-RS transmission cycle and subframe offset in a downlink subframe:

$T_{CSIRS}$: the cell specific subframe period for CSI-RS;
$\Delta_{CSIRS}$: the cell specific subframe offset for the CSI-RS subframe per period;
$n_f$: the index of radio frame; and
$n_s$: the slot index within one radio frame.

An exemplary subframe instance to transmit CSI-RS is specified by $n_f$ and $n_s$ that satisfy $(10 \times n_f + \lfloor n_s/2 \rfloor - \Delta_{CSIRS}) \mod T_{CSIRS} = 0$, where $T_{CSIRS}$ and $\Delta_{CSIRS}$ can be signaled to UE by a Radio Resource Control (RRC) parameter $I_{CSIRS}$, based on a certain predefined table. An exemplary table is provided in Table 2. One instance of such a table can be given by setting $T_1=5$, $T_2=10$, $T_3=15$, $T_4=20$, $T_5=30$, $T_6=40$, etc.

TABLE 2

| CSI-RS subframe configuration index | | |
|---|---|---|
| CSI-RS configuration index $I_{CSIRS}$ | CSI-RS periodicity $T_{CSIRS}$ (subframe) | CSI-RS subframe offset $\Delta_{CSIRS}$ (subframe) |
| $0 \sim (T_1 - 1)$ | $T_1$ | $I_{CSIRS}$ |
| $T_1 \sim \left(\sum_{i=1}^{2} T_i - 1\right)$ | $T_2$ | $I_{CSIRS} - T_1$ |
| $\left(\sum_{i=1}^{2} T_i\right) \sim \left(\sum_{i=1}^{3} T_i - 1\right)$ | $T_3$ | $I_{CSIRS} - \left(\sum_{i=1}^{2} T_i\right)$ |
| ... | ... | ... |
| $\left(\sum_{i=1}^{k-1} T_i - 1\right) \sim \left(\sum_{i=1}^{k} T_i - 1\right)$ | $T_k$ | $I_{CSIRS} - \left(\sum_{i=1}^{k-1} T_i - 1\right)$ |
| ... | ... | ... |
| $\geq \left(\sum_{i=1}^{K} T_i - 1\right)$ | | Reserved |

As illustrated in exemplary embodiments in FIGS. 2 and 3, the REs to carry each CSI-RS reuse pattern are fully determined by the number of CSI-RS ports and the location of CSI-RS RE #0 in each PRB. One framework may be created to cover CSI-RS reuse patterns that coexist with port-5 URS and another framework where CSI-RS reuse patterns do not coexist with port-5 URS.

The reuse patterns in FIG. 2(*a*) and FIG. 2(*b*) can be assigned to the cells in the same measurement set. Therefore, the normal-CP system has total of eight (5 from FIGS. 2 (*a*) and 3 from FIG. 2(*b*)) 8-Tx CSI-RS reuse patterns.

The reuse patterns in FIG. 3(*a*) and FIG. 3 (*b*) can co-exist in the same measurement set. Therefore, the extended-CP system can have a total of seven 8-Tx CSI-RS reuse patterns (4 from FIGS. 3(*a*) and 3 from FIG. 3(*b*)).

Figure 2A:
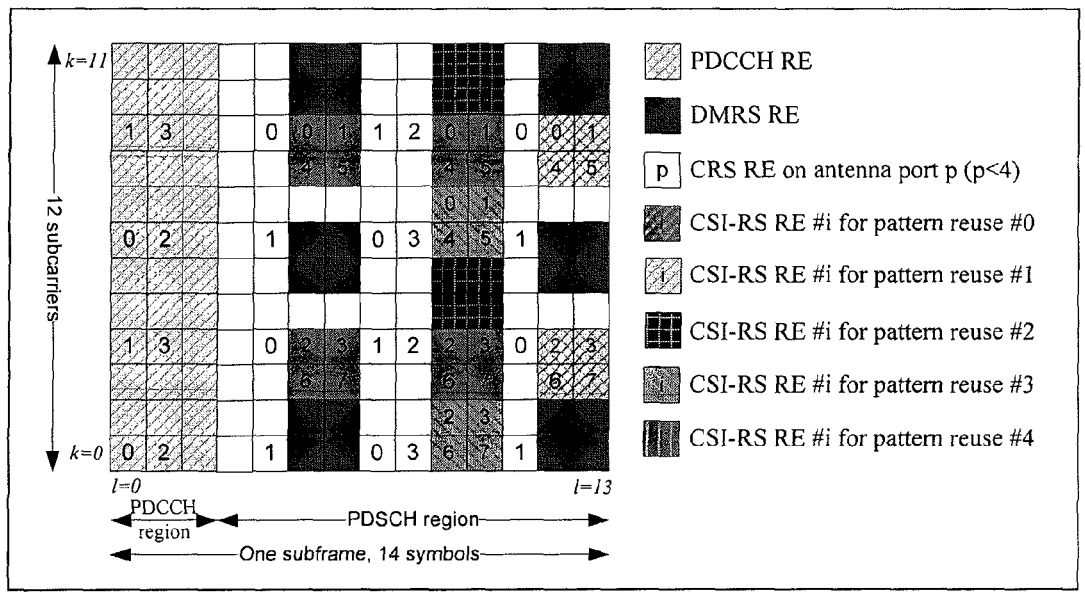
FIG. 2(a) illustrates an exemplary PRB having a normal-CP subframe that comprises PDCCH, DMRS, CRS, and CSR-RS REs according to an embodiment of the present invention.
Figure 2B:
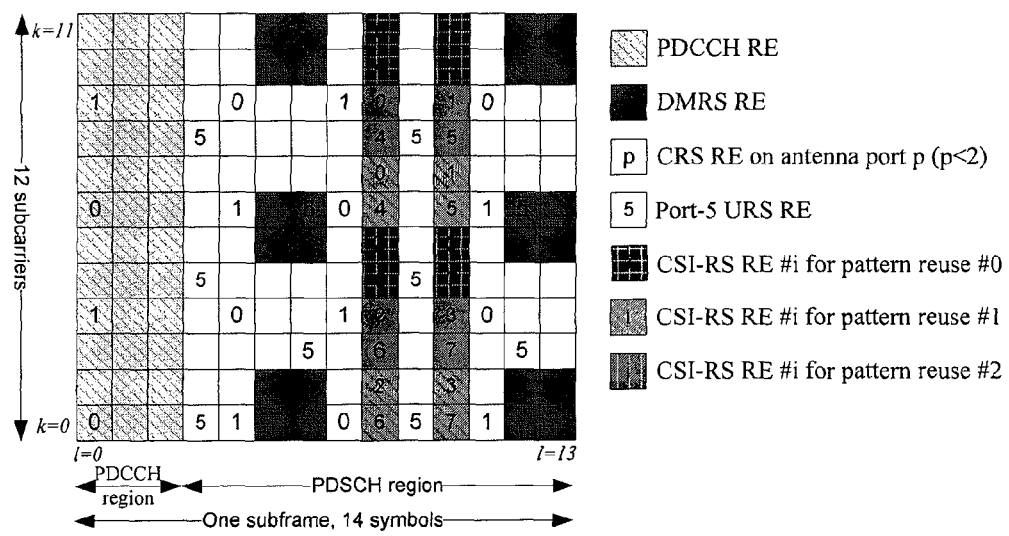
FIG. 2(b) illustrates an exemplary PRB having a normal-CP that comprises PDCCH, DMRS, CRS, Port-5 URS, and CSI-RS REs according to an embodiment of the present invention.
Figure 3A:
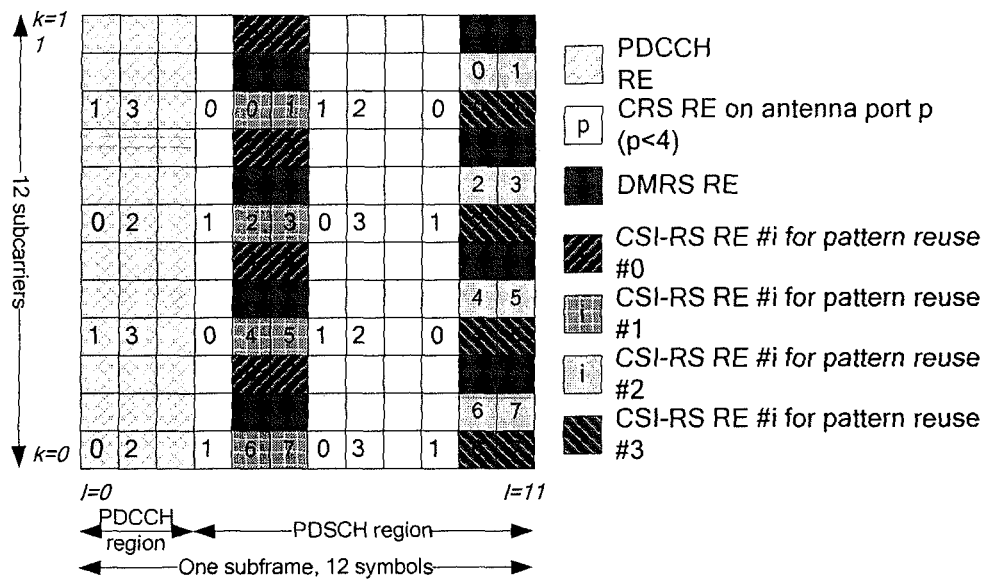
FIG. 3(a) illustrates an exemplary PRB having an extended-CP subframe that comprises PDCCH, CRS on antenna port p for p<4, DMRS, and CSI-RS REs according to an embodiment of the present invention.
Figure 3B:
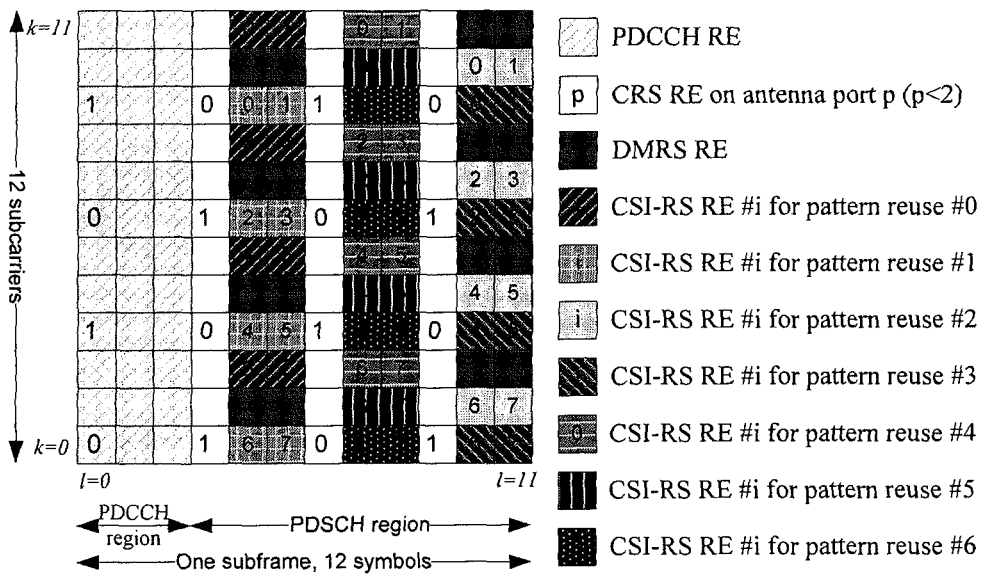
FIG. 3(b) illustrates an exemplary PRB having an extended-CP subframe that comprises PDCCH, CRS on antenna port p for p<2, DMRS, and CSI-RS REs according to an embodiment of the present invention.

The signal encoding of CSI-RS RE#0 for a 8-Tx reuse pattern can be identified by $0 \sim (N_{8Tx}-1)$ which utilizes $\lceil \log_2 N_{8Tx} \rceil$ signaling bits. This assumes that the location of CSI-RS RE #0 is identified by $<k_{r,0}, l_{r,0}>$, where $k_{r,0}$ and $l_{r,0}$ are respectively the subcarrier offset and symbol offset for the RE#0 location within one PRB for the r-th CSI-RS reuse pattern and the total number of different locations of CSI-RS RE #0 within one PRB is $N_{mTX}$ where m is the number of CSI-RS ports. Signal encoding is illustrated in the following examples:

Example-1:

$$N_{8Tx} = \begin{cases} 5 & \text{normal-}CP, \text{Fig. 2(a)} \\ 3 & \text{normal-}CP, \text{Fig. 2(b)} \\ 4 & \text{extended-}CP, \text{Fig. 3(a)} \\ 7 & \text{extended-}CP, \text{Fig. 3(b),} \end{cases}$$

wherein the encoding of RE#0 location is based on Table 3.

Example-2:

$$N_{8Tx} = \begin{cases} 5 & \text{normal-}CP, FS\text{-}1 \\ 8 & \text{normal-}CP, FS\text{-}2 \\ 4 & \text{extended-}CP, FS\text{-}1 \\ 7 & \text{extended-}CP, FS\text{-}2, \end{cases}$$

wherein the encoding of RE#0 location is based on Table 4.

Example-3:

$$N_{8Tx} = \begin{cases} 8 & \text{normal-}CP \\ 7 & \text{extended-}CP, \end{cases}$$

wherein the encoding of RE#0 location is based on Table 5.

For the nested 4Tx and 2Tx CSI-RS, $N_{4Tx}=2*N_{8Tx}$ and $N_{2Tx}=4*N_{8Tx}$:

TABLE 3

Encoding of CSI-RS RE#0 location for 8-Tx reuse pattern (Example-1)

| Encoded CSI-RS RE#0 (up to 3 bit) | Normal-CP, FIG. 2(a) | Normal-CP, FIG. 2(b) | Extended-CP, FIG. 3(a) | Extended-CP, FIG. 3(b) |
|---|---|---|---|---|
| 0 | <11, 9> | <11, 8> | <11, 4> | <11, 4> |
| 1 | <9, 9> | <9, 8> | <9, 4> | <9, 4> |
| 2 | <7, 9> | <7, 8> | <10, 10> | <10, 10> |
| 3 | <9, 5> | Not used | <9, 10> | <9, 10> |
| 4 | <9, 12> | | Not used | <11, 7> |
| 5 | Not used | | | <10, 7> |
| 6 | | | | <9, 7> |
| 7 | | | | Not used |

TABLE 4

Encoding of location of CSI-RS RE#0 for 8-Tx reuse pattern (Example-2)

| Encoded CSI-RS RE#0 (up to 3 bit) | Normal-CP, FS-1 | Normal-CP, FS-2 | Extended-CP, FS-1 | Extended-CP, FS-2 |
|---|---|---|---|---|
| 0 | <11, 9> | <11, 9> | <11, 4> | <11, 4> |
| 1 | <9, 9> | <9, 9> | <9, 4> | <9, 4> |
| 2 | <7, 9> | <7, 9> | <10, 10> | <10, 10> |
| 3 | <9, 5> | <9, 5> | <9, 10> | <9, 10> |
| 4 | <9, 12> | <9, 12> | Not used | <11, 7> |
| 5 | Not used | <11, 8> | | <10, 7> |
| 6 | | <9, 8> | | <9, 7> |
| 7 | | <7, 8> | | Not used |

TABLE 5

Encoding of location of CSI-RS RE#0 for 8-Tx reuse pattern (Example-3)

| Encoded CSI-RS RE#0 (up to 3 bit) | Normal-CP | Extended-CP |
|---|---|---|
| 0 | <11, 9> | <11, 4> |
| 1 | <9, 9> | <9, 4> |
| 2 | <7, 9> | <10, 10> |
| 3 | <9, 5> | <9, 10> |
| 4 | <9, 12> | <11, 7> |
| 5 | <11, 8> | <10, 7> |
| 6 | <9, 8> | <9, 7> |
| 7 | <7, 8> | Not used |

It is envisioned that the first $N_{8Tx}$ entries and the corresponding columns illustrating $<k_{r,0},l_{r,0}>$ in Table 3, Table 4 and Table 5 may be reordered. Thus, it is envisioned that the resulting encoding signal may also be reordered.

The locations of rest of REs (RE#1 ~RE#7) in the 8-Tx reuse pattern can be determined when the locations of RE#0 are given. The location of RE#0 for m-Tx ($m=N_{ANT}\in\{2,4,8\}$) reuse pattern can be either directly signaled or derived based on the actual number of CSI-RS ports ($N_{ANT}$) because of the nesting structure of the 2-Tx and 4-Tx CSI-RS patterns. Exemplary embodiments utilized to inform UE of the number of CSI-RS ports ($N_{ANT}$) and the actual location of RE#0 of assigned m-Tx reuse pattern are illustrated in the following examples:

EXAMPLE-1

Separate and Direct Encoding of $N_{ANT}$ and $<k_{r,0},l_{r,0}>$

In this exemplary signaling method, $N_{ANT}$ and the assigned CSI-RS RE#0 location are separately encoded. There are as many as $N_{2Tx}=4*N_{8Tx}$ different RE#0 locations. This signaling method costs as many as $\lceil\log_2 3\rceil+\lceil\log_2(4\times N_{8Tx})\rceil=7$ bits per cell. It also uses a table with $4*N_{8Tx}$ entries to encode $<k_{r,0},l_{r,0}>$ of the assigned CSI-RS reuse pattern.

EXAMPLE-2

Separate and Non-Direct Encoding of $N_{ANT}$ and $<k_{r,0},l_{r,0}>$, Where $<k_{r,0},l_{r,0}>$ is Derived from Other Parameters In this exemplary signaling $<k_{r,0},l_{r,0}>$ is derived from the nested 8-Tx CSI-RS reuse pattern by $f(x)\in\{0, 1, 2, 3\}$. $<k_{r,0},l_{r,0}>$ of the m-Tx ($m=N_{ANT}$) reuse pattern is equal to $<k_{r,z},l_{r,z}>$ of the nested 8-Tx reuse pattern where $z=m\cdot f(x,m)$. The function $f(x,m)$ is pre-defined and the parameter x can be either the cell identification parameter $N_{ID}^{cell}$ or another RRC-signaled parameter.

If $x=N_{ID}^{cell}$, one example of $f(x,m)$ is $f(N_{ID}^{cell},m)=\lfloor N_{ID}^{cell}/6\rfloor\bmod(8/m)$ to decouple the cell identification requirements based on CRS deployment and CSI-RS deployment. Here, the total signaling overhead is 5-bits per cell where 2-bits encode $N_{ANT}$ and 3-bits encode $<k_{r,0},l_{r,0}>$ of the nested 8-Tx reuse pattern. If x is a RRC-signaled parameter, $f(x,m)=x\in\{0, 1, 2, 3\}$. In this case, the total signaling overhead is 7-bits per cell.

For either choice of parameter x and function $f$, example-2 utilizes an exemplary table with $N_{8Tx}$ entries to encode $<k_{r,0},l_{r,0}>$ of the nested 8-Tx CSI-RS reuse pattern as given by the corresponding columns in Table 3, Table 4 and Table 5.

EXAMPLE-3

Joint Encoding and Signaling of $N_{ANT}$ and $<k_{r,0},l_{r,0}>$ $N_{ANT}$ and $<k_{r,0},l_{r,0}>$ can be jointly encoded to result in $\lceil \log_2(N_{8Tx}+N_{4Tx}+N_{2Tx}) \rceil = 6$ bits signaling per cell. This example can have a table with $(N_{8Tx}+N_{4Tx}+N_{2Tx})=7 \ N_{8Tx}$ entries to encode the assigned $N_{ANT}$ and $<k_{r,0},l_{r,0}>$ of the assigned CSI-RS reuse pattern.

EXAMPLE-4

An Exemplary Combination of Examples 2 and 3, i.e., Joint Encoding and Signaling of NANT Wherein Certain Parameters are Used to Derive $<k_{r,0},l_{r,0}>$ The assigned $<k_{r,0},l_{r,0}>$ of the m-Tx ($m=N_{ANT}$) reuse pattern is equal to $<k_{r,z},l_{r,z}>$ of the nested 8-Tx reuse pattern, where z and $N_{ANT}$ are jointly encoded according to exemplary Table 6 wherein the UE is informed of the reuse pattern location by a RRC-signaled CSI-RS configuration index $J_{CSIRS}$. It is envisioned that the entries in the first column $J_{CSIRS}$, the number of CSI-RS ports m=$N_{ANT}$, and the location of RE#0 in the nested 8-Tx CSI-RS pattern of Table 6 can be re-ordered and be within the scope of the invention. The exemplary table in Example-4 utilizes N 8-Tx entries to encode $<k_{r,0},l_{r,0}>$ of the nested 8-Tx CSI-RS reuse pattern which are given by the corresponding columns in Table 3, Table 4 and Table 5. Example 4 may use up to 6-bit signaling per cell wherein 3-bits indicate $J_{CSIRS}$ and 3-bits indicate the corresponding entries in Table 3, Table 4 and Table 5.

TABLE 6

Joint encoding of z and $N_{ANT}$ in Option-4

| CSI-RS configuration index $J_{CSIRS}$ | Number of CSI-RS ports (m = $N_{ANT}$) | Location of RE#0 in nested 8-Tx CSI-RS pattern (z) |
|---|---|---|
| 0 | 8 | 0 (=m*0) |
| 1 | 4 | 0 (=m*0) |
| 2 | 4 | 4 (=m*1) |
| 3 | 2 | 0 (=m*0) |
| 4 | 2 | 2 (=m*1) |
| 5 | 2 | 4 (=m*2) |
| 6 | 2 | 6 (=m*3) |

In another exemplary embodiment, the assigned CSI-RS RE locations per cell can be identified by a combination of $\langle k',l',n_s \rangle$ and $N_{CSIRS}$ where the three parameters $\langle k',l',n_s \rangle$ stand for k' as the subcarrier index (k', $0 \le k' < 12$), l' as the OFDM symbol index in slot (l', $0 \le l' < N_{symb}^{DL}$, where $N_{symb}^{DL}$ is 7 for a normal-CP subframe or 6 for an extended-CP subframe) and $n_s$ as the slot index per frame ($n_s$, $0 \le n_s < 20$). $\langle k',l',n_s \rangle$ and $N_{CSIRS}$ can be either jointly or separately signal encoded. Up to eight CSI-RS ports in LTE-A can be labeled with indices {15, 16, 17, 18, 19, 20, 21, 22}.

In exemplary subframes configured for CSI-RS transmission, the reference signal sequence r (m) can be mapped to complex-valued modulation symbols $a_{k,l}^{(p)}$ used as reference symbols for resource grid p according to: $a_{k,l}^{(p)} = w_{l''} \cdot r_{l,n_s}(m')$, where $$k = k' + 12 \cdot m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations for frame structure type 1 and 2, normal cyclic prefix} \\ 2l'' & \text{CSI reference signal configurations for frame structure type 2 only, normal cyclic prefix} \\ l'' & \text{CSI reference signal configurations for frame structure type 1 and 2, extended cyclic prefix} \end{cases}$$

$$l'' \in \{0, 1\}$$

$$w_{l''} = \begin{cases} 1 & p \in \{15, 17, 19, 21\} \\ (-1)^{l''} & p \in \{16, 18, 20, 22\} \end{cases}$$

$$m = 0, 1, \ldots, N_{RB}^{DL} - 1$$

$$m' = m + \left\lfloor \frac{N_{RB}^{max,DL} - N_{RB}^{DL}}{2} \right\rfloor,$$

wherein $N_{RB}^{DL}$ is the actual system bandwidth in units of RB (or equivalently PRB) and $N_{RB}^{max,DL}=110$ refers to the maximum system bandwidth in units of RB (or equivalently PRB). It can be seen that the complex-valued CSI-RS modulation symbols $a_{k,l}^{(p)}$ are the product of two components: the Walsh code $w_{l''}$ that orthogonalizes the CSI-RS signals of two ports sharing the same two subcarriers and the CSI-RS sequence $r_{l,n_s}(m')$. Both indices m and m' count over every RB in frequency domain. For the transmitted RB's indexed by m=0, 1, ..., $N_{RB}^{DL}-1$, the CSI-RS sequence transmitted on a port is segmented by index:

$$m' = \left\lfloor \frac{N_{RB}^{max,DL} - N_{RB}^{DL}}{2} \right\rfloor, \left\lfloor \frac{N_{RB}^{max,DL} - N_{RB}^{DL}}{2} \right\rfloor + 1,$$

$$\ldots, \left\lfloor \frac{N_{RB}^{max,DL} - N_{RB}^{DL}}{2} \right\rfloor + N_{RB}^{DL} - 1.$$

Joint Encoding: According to an exemplary joint signal encoded embodiment, the UE is jointly informed of $N_{CSIRS}$ and ⟨k',l',$n_s$⟩ through two exemplary configuration indices that respectively correspond to two exemplary tables:

One exemplary table (with a configuration index of $K_{CSIRS}$) lists the locations of CSI-RS RE#0, denoted as ⟨$k_0$,l', $n_s$⟩, in all allowed 8-port (instead of $N_{CSIRS}$-port) CSI-RS patterns. The above is illustrated in exemplary Table 7 for a normal CP and in exemplary Table 8 for an extended CP.

The second exemplary table (with a configuration index of $J_{CSIRS}$) illustrates the allowed $N_{CSIRS}$ and the parameter $k_A$ for $k_A = k' - k_0$. This second exemplary table is illustrated in Table 9.

According to an exemplary embodiment, the UE can derive ⟨$k_0$,l',$n_s$⟩, $k' = k_0 + k_A$, and $N_{CSIRS}$ upon reception of $K_{CSIRS}$ and $J_{CSIRS}$. The joint encoding may utilize a total of 6 bits (3 bits for the index of each table) in signaling overhead for both CP types.

TABLE 7

$K_{CSIRS}$ for a normal-CP

| | CSI Configuration index $K_{CSIRS}$ | ($k_0$, l') | $n_s$ mod 2 |
|---|---|---|---|
| Frame structure type 1 and 2 | 0 | (9, 5) | 0 |
| | 1 | (11, 2) | 1 |
| | 2 | (9, 2) | 1 |
| | 3 | (7, 2) | 1 |
| | 4 | (9, 5) | 1 |
| Frame structure type 2 only | 5 | (11, 1) | 1 |
| | 6 | (9, 1) | 1 |
| | 7 | (7, 1) | 1 |

TABLE 8

$K_{CSIRS}$ for an extended-CP

| | CSI Configuration $K_{CSIRS}$ | ($k_0$, l') | $n_s$ mod 2 |
|---|---|---|---|
| Frame structure type 1 and 2 | 0 | (11, 4) | 0 |
| | 1 | (9, 4) | 0 |
| | 2 | (10, 4) | 1 |
| | 3 | (9, 4) | 1 |
| Frame structure type 2 only | 4 | (11, 1) | 1 |
| | 5 | (10, 1) | 1 |
| | 6 | (9, 1) | 1 |

TABLE 9

$J_{CSIRS}$ for both a normal-CP and an extended-CP

| | | $k_A = k' - k_0$ | |
|---|---|---|---|
| CSI-RS Configuration Index $J_{CSIRS}$ | $N_{CSIRS}$ | Normal CP | Extended CP |
| 0 | 2 | 0 | 0 |
| 1 | 2 | 6 | 3 |
| 2 | 2 | 1 | 6 |
| 3 | 2 | 7 | 9 |
| 4 | 4 | 0 | 0 |
| 5 | 4 | 1 | 6 |
| 6 | 8 | 0 | 0 |

Separate Encoding: According to exemplary embodiments, separate encoding can enumerate all possible ⟨k',l',$n_s$⟩ for each $N_{CSIRS}$ value. For example, separate encoding can enumerate 32 cases for a normal-CP and 28 cases for an extended-CP. Certain exemplary ordering rules may be utilized to separately encode. For example, given an exemplary bit format $b_4b_3b_2b_1b_0$, the numeration index of ⟨k',l',$n_s$⟩ can be specified for $N_{CSIRS}=2$. The exemplary bit format $b_4b_3b_2b_10$ can be used to specify ⟨k',l',$n_s$⟩ for $N_{CSIRS}=4$ and $b_4b_3b_200$ can be used to specify ⟨k',l',$n_s$⟩ for $N_{CSIRS}8$.

The above encoding rule may result in the following exemplary benefits: $b_1b_0$ can specify the relative location of a 2-port CSI-RS pattern within an 8-port CSI-RS pattern. $b_1$ can specify the relative location of a 4-port CSI-RS pattern within a 8-port CSI-RS pattern. Further, bit $b_0$ for $N_{CSIRS}=4$ and $b_1b_0$ for $N_{CSIRS}=8$ can be kept free from transmission or marked as reserved for other purposes in a RRC signaling format. One of ordinary skill in the art would understand that various other benefits may be observed and derived according to the various exemplary embodiments disclosed relating to separate encoding.

An exemplary implementation based upon the exemplary embodiments of separate encoding is given in Table 10 for a normal-CP subframe and in Table 11 for an extended-CP subframe. The encodings of ⟨k',l',$n_s$⟩ are given in Table 10 and Table 11 according to $N_{CSIRS}=\{2, 4, 8\}$.

TABLE 10

Encoding of ⟨k', l', $n_s$⟩ for normal CP

| | | Number of CSI reference signals configured | | | | | |
|---|---|---|---|---|---|---|---|
| | | 2 | | 4 | | 8 | |
| | CSI Configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (3, 5) | 0 | | | | |
| | 2 | (8, 5) | 0 | (8, 5) | 0 | | |
| | 3 | (2, 5) | 0 | | | | |
| | 4 | (11, 2) | 1 | (11, 2) | 1 | (11, 2) | 1 |

TABLE 10-continued

Encoding of $\langle k', l', n_s \rangle$ for normal CP

|  | CSI Configuration | Number of CSI reference signals configured | | | | | |
|---|---|---|---|---|---|---|---|
|  |  | 2 | | 4 | | 8 | |
|  |  | (k', l') | $n_s$ mod 2 | (k', l') | $n_s$ mod 2 | (k', l') | $n_s$ mod 2 |
|  | 5 | (5, 2) | 1 |  |  |  |  |
|  | 6 | (10, 2) | 1 | (10, 2) | 1 |  |  |
|  | 7 | (4, 2) | 1 |  |  |  |  |
|  | 8 | (9, 2) | 1 | (9, 2) | 1 | (9, 2) | 1 |
|  | 9 | (3, 2) | 1 |  |  |  |  |
|  | 10 | (8, 2) | 1 | (8, 2) | 1 |  |  |
|  | 11 | (2, 2) | 1 |  |  |  |  |
|  | 12 | (7, 2) | 1 | (7, 2) | 1 | (7, 2) | 1 |
|  | 13 | (1, 2) | 1 |  |  |  |  |
|  | 14 | (6, 2) | 1 | (6, 2) | 1 |  |  |
|  | 15 | (0, 2) | 1 |  |  |  |  |
|  | 16 | (9, 5) | 1 | (9, 5) | 1 | (9, 5) | 1 |
|  | 17 | (3, 5) | 1 |  |  |  |  |
|  | 18 | (8, 5) | 1 | (8, 5) | 1 |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (5, 1) | 1 |  |  |  |  |
|  | 22 | (10, 1) | 1 | (10, 1) | 1 |  |  |
|  | 23 | (4, 1) | 1 |  |  |  |  |
|  | 24 | (9, 1) | 1 | (9, 1) | 1 | (9, 1) | 1 |
|  | 25 | (3, 1) | 1 |  |  |  |  |
|  | 26 | (8, 1) | 1 | (8, 1) | 1 |  |  |
|  | 27 | (2, 1) | 1 |  |  |  |  |
|  | 28 | (7, 1) | 1 | (7, 1) | 1 | (7, 1) | 1 |
|  | 29 | (1, 1) | 1 |  |  |  |  |
|  | 30 | (6, 1) | 1 | (6, 1) | 1 |  |  |
|  | 31 | (0, 1) | 1 |  |  |  |  |

TABLE 11

Encoding of $\langle k', l', n_s \rangle$ for extended CP

|  | CSI Configuration | Number of CSI reference signals configured | | | | | |
|---|---|---|---|---|---|---|---|
|  |  | 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (8, 4) | 0 |  |  |  |  |
|  | 2 | (5, 4) | 0 | (5, 4) | 0 |  |  |
|  | 3 | (2, 4) | 0 |  |  |  |  |
|  | 4 | (9, 4) | 0 | (9, 4) | 0 | (9, 4) | 0 |
|  | 5 | (6, 4) | 0 |  |  |  |  |
|  | 6 | (3, 4) | 0 | (3, 4) | 0 |  |  |
|  | 7 | (0, 4) | 0 |  |  |  |  |
|  | 8 | (10, 4) | 1 | (10, 4) | 1 | (10, 4) | 1 |
|  | 9 | (7, 4) | 1 |  |  |  |  |
|  | 10 | (4, 4) | 1 | (4, 4) | 1 |  |  |
|  | 11 | (1, 4) | 1 |  |  |  |  |
|  | 12 | (9, 4) | 1 | (9, 4) | 1 | (9, 4) | 1 |
|  | 13 | (6, 4) | 1 |  |  |  |  |
|  | 14 | (3, 4) | 1 | (3, 4) | 1 |  |  |
|  | 15 | (0, 4) | 1 |  |  |  |  |
| Frame structure type 2 only | 16 | (11, 1) | 1 | (11, 1) | 1 | (11, 1) | 1 |
|  | 17 | (8, 1) | 1 |  |  |  |  |
|  | 18 | (5, 1) | 1 | (5, 1) | 1 |  |  |
|  | 19 | (2, 1) | 1 |  |  |  |  |
|  | 20 | (10, 1) | 1 | (10, 1) | 1 | (10, 1) | 1 |
|  | 21 | (7, 1) | 1 |  |  |  |  |
|  | 22 | (4, 1) | 1 | (4, 1) | 1 |  |  |
|  | 23 | (1, 1) | 1 |  |  |  |  |
|  | 24 | (9, 1) | 1 | (9, 1) | 1 | (9, 1) | 1 |
|  | 25 | (6, 1) | 1 |  |  |  |  |
|  | 26 | (3, 1) | 1 | (3, 1) | 1 |  |  |
|  | 27 | (0, 1) | 1 |  |  |  |  |

Figure 4:
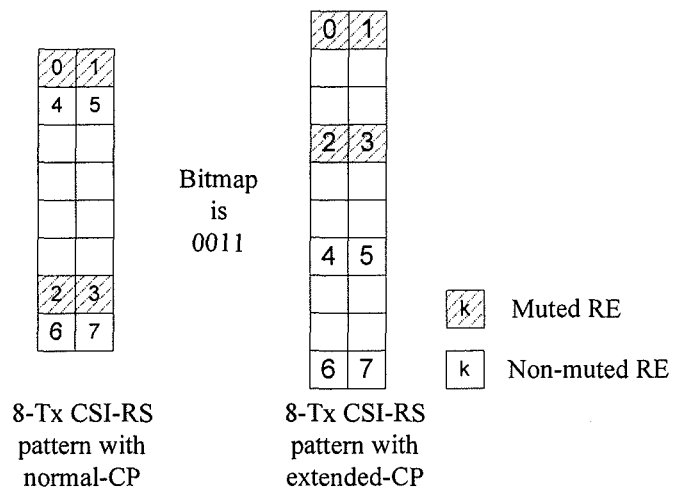
FIG. 4 illustrates an exemplary muting configuration according to an embodiment of the present invention.

According to exemplary embodiments of the invention, CSI-RSs may be transmitted in slots where $n_s$ mod 2 fulfils the conditions recited in Table 7 and Table 8 for exemplary embodiments utilizing joint signal encoding methods and Table 10 and Table 11 may be used for exemplary embodiments utilizing separate signal encoding methods. Note that Table 7 and Table 8 define the symbol index l' within one slot whereas Table 3 defines the symbol index $l_{r,0}$ within one subframe or two slots. Ultimately, the CSI-RS patterns utilized by the exemplary embodiments disclosed in Table 3, Table 7, and Table 8 may be the same as shown in FIGS. 2-4. It is further envisioned that the table rows may be re-ordered and still be within the scope of this invention.

The invention is generally related to the positions of CSI-RS REs. Thus, the value of each RE and the corresponding sequence function r(m) has not been presented. However, the function r(m) in the above equations are in their general form. Thus, it is envisioned that the CSI-RS locations may exist with varying sequence functions r(m) and still be within the scope of the invention. Further, it is envisioned that various other options and values for the table rows in Table 7-Table 11 could be utilized and be within the scope of the invention.

Implementation and Configuration of Muting: According to an exemplary embodiment, the CoMP feature in LTE Rel-10 is limited to intra-site CoMP where no CoMP signaling is transmitted over an X2 interface. Accordingly, the measurement set that the UE sees in Rel10 does not contain information relating to cells that belong to different cell sites. There would be limited benefit to muting only the CSI-RS of inter-cells of the same site. Additionally, muting is much more desirable in the border areas of inter-site-coverage to facilitate better CSI-RS measurement.

If muting is defined in Rel10, the muted PDSCH REs may not be limited to those colliding with all CSI-RS REs in the measurement sets that the serving cell belongs to. Some PDSCH REs may not collide with any CSI-RS REs in the measurement sets but it may still be desirable to mute them. On the other hand, there could be some PDSCH REs that collide with certain CSI-RS REs in the measurement sets where it would be desirable to partially mute them. Accordingly, for example, the muting configuration of one cell is not directly based on all measurement sets that the cell belongs to. Instead, for example, the cell-specific muted REs can be configured to be subsets of $\psi$, where each subset is associated with a muting cycle and a subframe offset. Additionally, $\psi$ may contain all the CSI-RS RE locations as illustrated in FIGS. 2 and 3.

Certain exemplary embodiments of $\psi$ are provided below. However, $\psi$ may be constructed in a multitude of ways as understood by a person having ordinary skill in the art and still be within the scope of the invention.

Example-1

Direct Signaling on a Per-Cell-basis CSI-RS: each subset is defined as a set of CSI-RS REs from each interfered-cell. The number of subsets is equal to the number of non-serving cells whose CSI-RS REs are interfered with by the PDSCH in the serving cell. Generally, the number of subsets is no smaller than the measurement set size. Each subset can have the same signaling format to indicate the location of each cell in CSI-RS measurement set as previously described.

Example-2

Bitmap per Single 8-Tx Pattern: each subset contains 8 REs that construct one 8-Tx reuse patterns in FIGS. 2 and 3. The configuration of each subset includes the following signaling information:

1) an Index of RE#0 per subframe of the 8-Tx pattern encoded with 3-bits as illustrated in the exemplary embodiments of Table 3, Table 4 and Table 5;
2) a muting bitmap encoded with 4-bits wherein the j-th bit in the bitmap is set to 1, the two PDSCH REs in the corresponding locations that are labeled by <2j, 2j+1> in the 8-Tx reuse pattern are muted; if the j-th bit in the bitmap is set to 0, the two REs that are labeled by <2j, 2j+1> in the 8-Tx reuse pattern are not muted as shown in the exemplary embodiment of FIG. 3; and
3) a subframe duty cycle and a subframe offset for the muting as shown in the exemplary embodiment of Table 2.

According to an exemplary embodiment, it may be efficient to employ the method of Example-2 when the CSI-RS transmissions are arranged so that the neighboring cells are configured with the same muting cycle and the same subframe offset. This is applicable to the neighboring cells whose 4-Tx or 2-Tx CSI-RS are nested into the same 8-Tx reuse pattern.

Example-3

Bitmap per all 2-Tx patterns in subframe: all CSI-RS related muting per serving cell may be in one subframe. According to the exemplary embodiment of Example-3, all possible muting locations in one subframe are identified by a single bitmap that contains $4 \times N_{8Tx}$ bits. Each bit in this bitmap indicates whether the corresponding two REs that are mapped to one of $4 \times N_{8Tx}$ CDM-pairs of the CSI-RS in the whole PRB are muted or not wherein $N_{8Tx}$ may defined as illustrated in the exemplary encoding tables of Table 3, Table 4 and Table 5.

The configuration of each subset of Example-3 includes the following signaling information: 1) a muting bitmap of $4 \times N_{8Tx}$ bits where the j-th bit indicates whether the two REs labeled by <2×(j mod 4), 2×(j mod 4)+1> in the $\lfloor j/N_{8Tx} \rfloor$-th 8-Tx reuse pattern should be muted; 2) a subframe duty cycle and a subframe offset for the muting as illustrated in the exemplary embodiments of Table 2.

According to an exemplary embodiment, partial muting may be modeled mathematically so that muting takes place on a fraction (P/Q) of the total REs that have been fully muted. In a further exemplary embodiment, P may be fixed to equal 1 in order to reduce the number of variables and to simplify the muting configuration. In a further exemplary embodiment, full-muting may be considered a special case of partial muting where Q=P=1. In a further exemplary embodiment, partial muting can be performed in the cell-domain, the time-domain, the frequency-domain, or the spatial-domain or any combination thereof.

According to an exemplary embodiment, the cell-domain partial muting can be implemented by enabling muting in some of cells and disabling muting in the rest of the cells. Accordingly, partial muting is defined system-wide rather than on a per cell basis. According to further exemplary embodiments, any given single cell may have two states that relate to muting: no muting and full muting.

According to an exemplary embodiment, time-domain partial muting can be implemented by assigning the muting cycle as $Q \times T_{CSIRS}$, where $T_{CSIRS}$ is the corresponding CSI-RS cycle as illustrated in the exemplary embodiments of Table 2.

According to an exemplary embodiment, frequency-domain partial muting can be implemented by applying the muting only in the PRB whose index k satisfies k mod Q=0.

According to an exemplary embodiment, spatial-domain partial muting is a variation of frequency-domain partial muting where different CSI-RS ports may correspond to frequency-domain partial muting with different PRB-offsets. More specifically, the pair of RE locations identified by <2j, 2j+1> in FIG. 2 and FIG. 2 are muted in the PRB with index k if: (i) (k−j) mod Q=0; and (ii) <2j, 2j+1> is identified as a muted pair of REs as described in the construction of a muting subset.

According to exemplary embodiments, time-domain partial muting does not require extra signaling to carry parameter Q as Q is contained in the signaling of a muting cycle. However, the partial muting in the frequency-domain and the spatial domain needs to signal the parameter Q along with the basic muting configuration as described in the construction of the muting subset. If any RE of the RE pair that is needed to be muted actually carries the non-PDSCH signal, such as CRS or port-5 URS, the muting on both REs of the RE pair is not performed.

In implementation, the above described architecture, methods and their variations may be implemented as computer software instructions or firmware instructions. Such instructions may be stored in an article with one or more machine-readable storage devices connected to one or more computers or integrated circuits or digital processors such as digital signal processors and microprocessors. In a communication system of 3GPP LTE and/or LTE-A, the CSI-RS transmission method and related signaling flow and process may be implemented in the form of software instructions or firmware instructions for execution by a processor in the transmitter and/or receiver or the transmission and reception controller. In operation, the instructions are executed by one or more processors to cause the transmitter and receiver or the transmission and reception controller to perform the described functions and operations.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:

1. A method for transmitting a channel state information reference signal (CSI-RS) comprising:
    identifying a location of one or more subframes where one or more CSI-RS reuse patterns are transmitted;
    identifying a location of one or more resource elements (REs) used to transmit a CSI-RS within a CSI-RS subframe wherein the REs that comprise a CSI-RS reuse pattern are specified by the number of CSI-RS ports and the location of a first resource element (RE #0) in the reuse pattern;
    providing a location of the one or more subframes and one or more REs where the one or more CSI-RS reuse patterns are transmitted to one or more pieces of user equipment (UE); and
    generating one or more CSI-RS modulation symbols in one or more CSI-RS REs, respectively, where each symbol contains a CSI-RS sequence element as a multiplication component.

2. The method of claim 1 wherein the subframe instances that transmit the CSI-RS are specified by a frame index $n_f$ and a slot index $n_s$ ($0 \leq n_s < 20$) that satisfies $(10 \times n_f + \lfloor n_s/2 \rfloor - \Delta_{CSIRS})$ mod $T_{CSIRS}=0$, where $T_{CSIRS}$ and $\Delta_{CSIRS}$ are respectively the subframe period and the subframe offset of the CSI-RS, and are signaled to the UE by a high-layer radio resource control (RRC) parameter $I_{CSIRS}$, based upon a predefined table, where $I_{CSIRS}$ is the CSI-RS configuration index.

3. The method of claim 1 wherein a number of CSI-RS ports and the location of RE #0 in the CSI-RS reuse pattern are separately encoded.

4. The method of claim 3 wherein the number of CSI-RS ports ($N_{ANT}$) is encoded in 2 bits, wherein the 2 bit binary pattern=01 for $N_{ANT}$=2, 10 for $N_{ANT}$=4, and 11 for $N_{ANT}$=8.

5. The method of claim 3 wherein the location of RE#0 is encoded in $\lceil \log_2(4 \times N_{8Tx}) \rceil$ bits based on a table of $4*N_{8Tx}$ entries that include all locations of CSI-RS REs whose RE indices are even numbers across all CSI-RS reuse patterns of eight CSI-RS antenna ports, where $N_{8Tx}$ is equal to the number of all CSI-RS reuse patterns for eight CSI-RS antenna ports.

6. The method of claim 3 wherein:
    the location of the RE#0 of the m−Tx(m=the number of CSI-RS antenna ports) CSI-RS reuse pattern is equal to the location of a second resource element RE#z of a nested CSI-RS reuse pattern of eight CSI-RS antenna ports for z=m ·$f(x,m)$, where $f(x,m) \in \{0,1,2,3\}$ is a predefined function and the parameter x can be either the cell identification parameter or another RRC-signaled parameter; and
    $\lceil \log_2 N_{8Tx} \rceil$, bits are used to encode the RE#0 location of the nested CSI-RS reuse pattern based on a pre-defined table with $N_{8Tx}$ entries, where $N_{STx}$ is equal to the number of all CSI-RS reuse patterns for eight CSI-RS antenna ports.

7. The method of claim 6 wherein x is an RRC-signaled parameter and $f(x,m)=x \in \{0,1,2,3\}$ requires 2 more signaling bits for x.

8. The method of claim 1, wherein
    the location of the RE#0 of the m−Tx (m=the number of CSI-RS antenna ports) CSI-RS reuse pattern is equal to the location of RE#z of a nested CSI-RS reuse pattern of eight CSI-RS antenna ports, where z and m are jointly encoded; and
    $\lceil \log_2 N_{8Tx} \rceil$ bits are used to encode the RE#0 location of the nested reuse pattern based on a pre-defined table with $N_{8Tx}$ entries, where $N_{8Tx}$ is equal to the number of all CSI-RS reuse patterns for eight CSI-RS antenna ports.

9. The method of claim 5, 6, 7, or 8, wherein $$N_{8Tx} = \begin{cases} 8 & \text{normal Cyclic prefix} \\ 7 & \text{extended Cyclic prefix} \end{cases}$$

10. The method of claim 1, wherein
    the relation between the index (m') of CSI-RS sequence element ($r_{l,n_s}(m')$) and the frequency-domain index (m)

of physical resource block containing the CSI-RS RE to which the CSI-RS sequence element is mapped is given by $$m' = m + \left\lfloor \frac{N_{RB}^{max,DL} - N_{RB}^{DL}}{2} \right\rfloor$$

where $N_{RB}^{DL}$ is the actual system bandwidth in number of physical resource block and $N_{RB}^{max,DL}$ is the maximum supported bandwidth in number of physical resource block, and wherein the transmitted segment of CSI-RS sequence $r_{l,n_s}$ (m') is determined by sequence element index $$m' = \left\lfloor \frac{N_{RB}^{max,DL} - N_{RB}^{DL}}{2} \right\rfloor, \left\lfloor \frac{N_{RB}^{max,DL} - N_{RB}^{DL}}{2} \right\rfloor + 1,$$
$$\ldots, \left\lfloor \frac{N_{RB}^{max,DL} - N_{RB}^{DL}}{2} \right\rfloor + N_{RB}^{DL} - 1.$$

11. A system configured to receive a channel state information reference signal (CSI-RS), the system comprising:
one or more subframes within a physical resource block (PRB), wherein the subframes comprise one or more CSI-RS reuse patterns;
one or more resource elements (REs) used to transmit CSI-RS within the CSI-RS subframe wherein the REs that comprise the CSI-RS reuse patterns are specified by the number of CSI-RS ports and the location of a first resource element (RE #0) in the reuse pattern;
user equipment (UE), wherein the UE comprises location information relating to the one or more subframes and the one or more REs; and
one or more CSI-RS modulation symbols configured for transmission over one or more REs within one or more subframes, where each CSI-RS symbol contains a CSI-RS sequence element as a multiplication component.

12. The system of claim 11 wherein the subframe instances that transmit the CSI-RS are specified by a frame index $n_f$ and a slot index $n_s$ that satisfy $(10 \times n_f + \lfloor n_s/2 \rfloor - \Delta_{CSIRS}) \bmod T_{CSIRS} = 0$, where $T_{CSIRS}$ and $\Delta_{CSIRS}$ are respectively the subframe period and the subframe offset of the CSI-RS, and are signaled to the UE by a high-layer radio resource control (RRC) parameter $I_{CSIRS}$, based upon a predefined table, where $I_{CSIRS}$ is the CSI-RS configuration index.

13. The system of claim 11 wherein a number of CSI-RS ports and the location of RE #0 in the CSI-RS reuse pattern are separately encoded.

14. The system of claim 13 wherein the number of CSI-RS ports ($N_{ANT}$) is encoded in 2 bits, wherein the 2 bit binary pattern=01 for $N_{ANT}$=2, 10 for $N_{ANT}$=4, and 11 for $N_{ANT}$=8.

15. The system of claim 13 wherein the location of RE#0 is encoded in $\lceil \log_2(4 \times N_{8Tx}) \rceil$ bits based on a table of 4*$N_{8Tx}$ entries that include all locations of CSI-RS REs whose RE indices are even numbers across all CSI-RS reuse patterns of eight CSI-RS antenna ports, where $N_{8Tx}$ equals to the number of all CSI-RS reuse patterns for eight CSI-RS antenna ports.

16. The system of claim 15 wherein $$N_{8Tx} = \begin{cases} 8 & \text{normal} \\ 7 & \text{extended Cyclic prefix} \end{cases}$$

17. The system of claim 11, wherein the relation between the index (m') of CSI-RS sequence element ($r_{l,n_s}$ (m')) and the frequency-domain index (m) of a physical resource block containing the CSI-RS RE to which the CSI-RS sequence element is mapped is given by $$m' = m + \left\lfloor \frac{N_{RB}^{max,DL} - N_{RB}^{DL}}{2} \right\rfloor$$

where $N_{RB}^{DL}$ is the actual system bandwidth in number of physical resource block and $N_{RB}^{max,DL}$ is the maximum supported bandwidth in number of physical resource block; equivalently, the transmitted segment of CSI-RS sequence $r_{l,n_s}$ (m') is determined by sequence element index $$m' = \left\lfloor \frac{N_{RB}^{max,DL} - N_{RB}^{DL}}{2} \right\rfloor, \left\lfloor \frac{N_{RB}^{max,DL} - N_{RB}^{DL}}{2} \right\rfloor + 1,$$
$$\ldots, \left\lfloor \frac{N_{RB}^{max,DL} - N_{RB}^{DL}}{2} \right\rfloor + N_{RB}^{DL} - 1.$$

* * * * *